United States Patent [19]

Corbett

[11] Patent Number: 5,390,523
[45] Date of Patent: Feb. 21, 1995

[54] COUPLING FOR SHOULDER ENDED PIPES

[76] Inventor: Michael R. Corbett, 110 Ridge Road, La Lucia, Natal, South Africa

[21] Appl. No.: 40,351

[22] Filed: Mar. 30, 1993

[30] Foreign Application Priority Data

| Mar. 30, 1992 | [ZA] | South Africa | 92/2288 |
| Aug. 4, 1992 | [ZA] | South Africa | 92/5835 |

[51] Int. Cl.⁶ .............................................. B21D 5/06
[52] U.S. Cl. ........................................ 72/377; 72/327; 72/334; 72/375; 72/415
[58] Field of Search .................. 72/327, 334, 380, 384, 72/415, 374, 375, 377

[56] References Cited

U.S. PATENT DOCUMENTS

| 10,857 | 8/1887 | Taplin | 72/375 |
| 1,803,542 | 5/1931 | Boyle, Jr. | 72/415 |
| 2,748,455 | 6/1956 | Draper et al. | 72/415 |
| 4,741,194 | 5/1988 | Kozyra et al. | 72/334 |

FOREIGN PATENT DOCUMENTS

| 0071586 | 2/1983 | European Pat. Off. . | |
| 1108029 | 1/1956 | France | 72/415 |
| 2107387 | 11/1971 | Germany . | |
| 2651338 | 6/1977 | Germany | 72/377 |
| 61-32711 | 2/1986 | Japan . | |
| 1724407 | 4/1992 | U.S.S.R. | 72/415 |
| 1726094 | 4/1992 | U.S.S.R. | 72/415 |

*Primary Examiner*—David Jones
*Attorney, Agent, or Firm*—Young & Thompson

[57] ABSTRACT

A method of producing a coupling for pipes includes the steps of subjecting a predetermined length of desired cross-sectional profiled material to a bending process in a mould having a semi-circular portion to form an item of semi-circular shape; forming bent ends of predetermined size on the profiled material; and then coining the bent ends to lie in an identical horizontal plane as a horizontal diameter of the item of semi-circular shape. The coining step is accompanied by a substep of forcing excess material from the predetermined length of profiled material into a zone between the semi-circular portion of the mould and the bent ends of predetermined size on the profiled material.

7 Claims, 9 Drawing Sheets

COUPLING FOR SHOULDER ENDED PIPES

FIELD OF THE INVENTION

This invention relates to couplings for shoulder ended and grooved-ended pipes in particular and to pipes in general.

BACKGROUND OF THE INVENTION

The couplings for such pipes are cast in two portions which are linked by means of nuts and bolts. The casting process is not ideal and is often subject to inaccuracies and is expensive.

It is an object of present invention to provide a method of producing coupling which is not only more accurate and easy but is also less expensive than prior art methods.

SUMMARY OF THE INVENTION

According to the invention a method for producing a coupling for pipes includes the steps of subjecting a predetermined length of desired cross sectional profile to a bending process to form an item of semicircular side view, forming or pre-forming bent over ends of predetermined size; and then coining these ends to lie in the same horizontal plane as the horizontal diameter of the item, the coining operation being accompanied by forcing excess material into the zone between the semi-circular portion and the bent-over ends.

In one form of the invention the profiled length is first subjected to a cold bending process to form the bent-over ends of predetermined size.

The item which results can then be subjected to hot bending process to form a semi-circular item and the bent-over ends are coined to lie in the same horizontal plane as the horizontal diameter of the item, the coining operation being accompanied by forcing excess material into the zone between the semi-circular portion and the bent-over ends.

Alternatively, the profiled length is first subjected to a cold bending process to form a U-shaped item bending the arms of the U above the semi-circular portion, applying a spreading force to such arms; then applying a predetermined force longitudinal to the arms to upset the zone, and then completing the spreading force for the arms to lie in the same horizontal plane as the horizontal diameter of the semi-circular portion.

The arms may be heated prior to the application of the spreading force.

It will be appreciated that the sequence of steps may be varied for example the upsetting step may precede the cold bending step, The degree of upset is chosen having regard to the desired thickness of the ears at the zone immediately adjacent the semi circular portion—otherwise the thickness of metal at that zone may be too thin and therefore be subject to serious weakness.

The spreading action may be accompanied by the formation of orifices through the ears and there may also be a finishing operation for the ends of the ears, so that the finished coupling emerges from the die,

BRIEF DESCRIPTION OF THE DRAWINGS

Embodiments of the invention are described below with reference to the accompanying drawings in which.

DETAILED DESCRIPTION OF THE PREFERRED EMBODIMENTS

Figure 1:
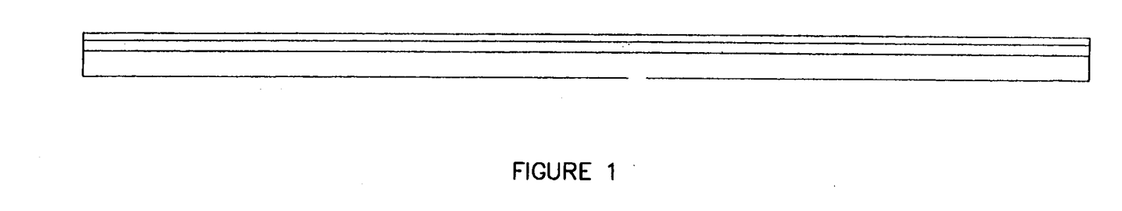
FIG. 1 is a side view of a predetermined length of profiled metal.
Figure 2:
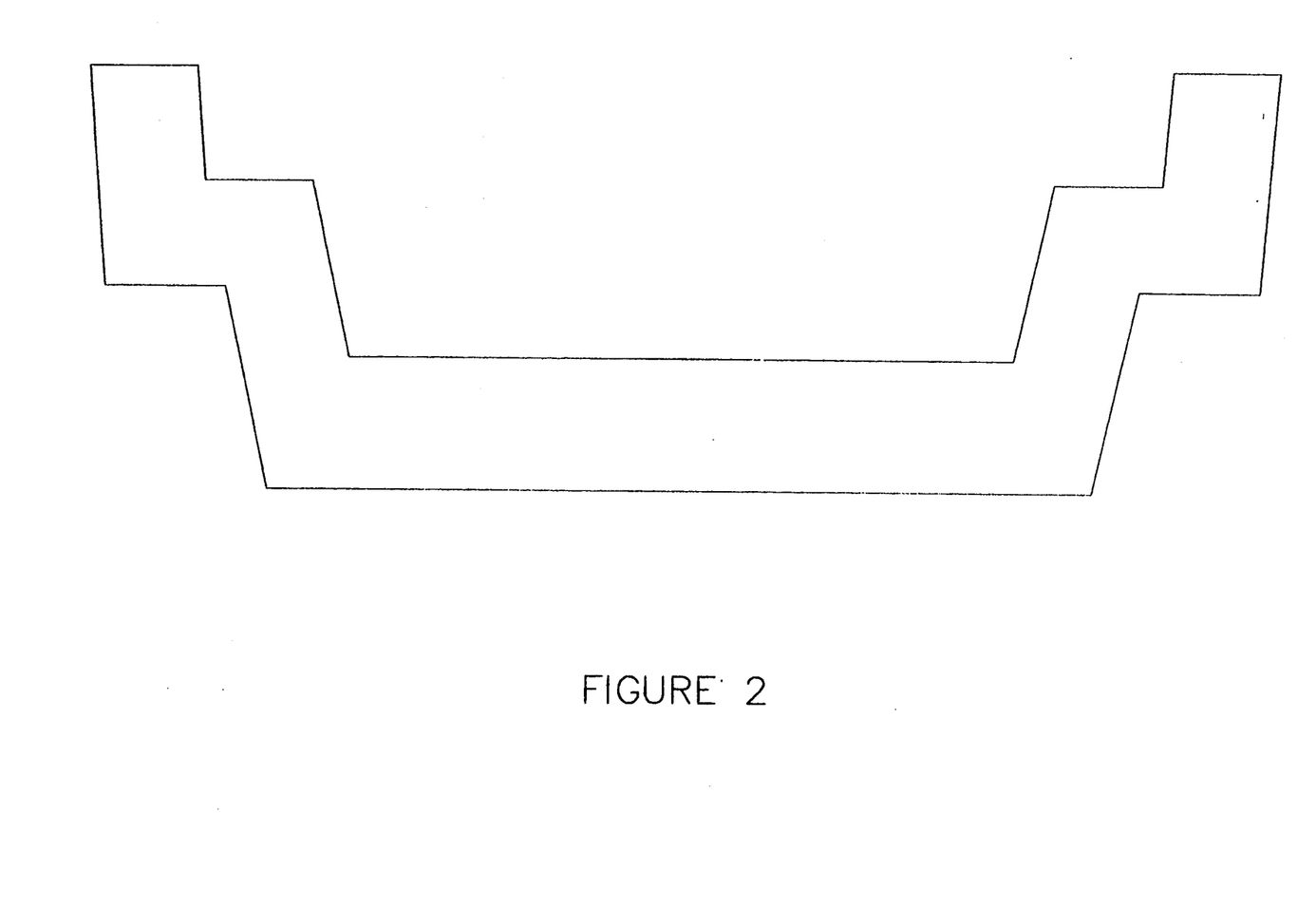
FIG. 2 is a cross sectional view of the profile of FIG. 1 after a forming process in the press as described below.
Figure 3:
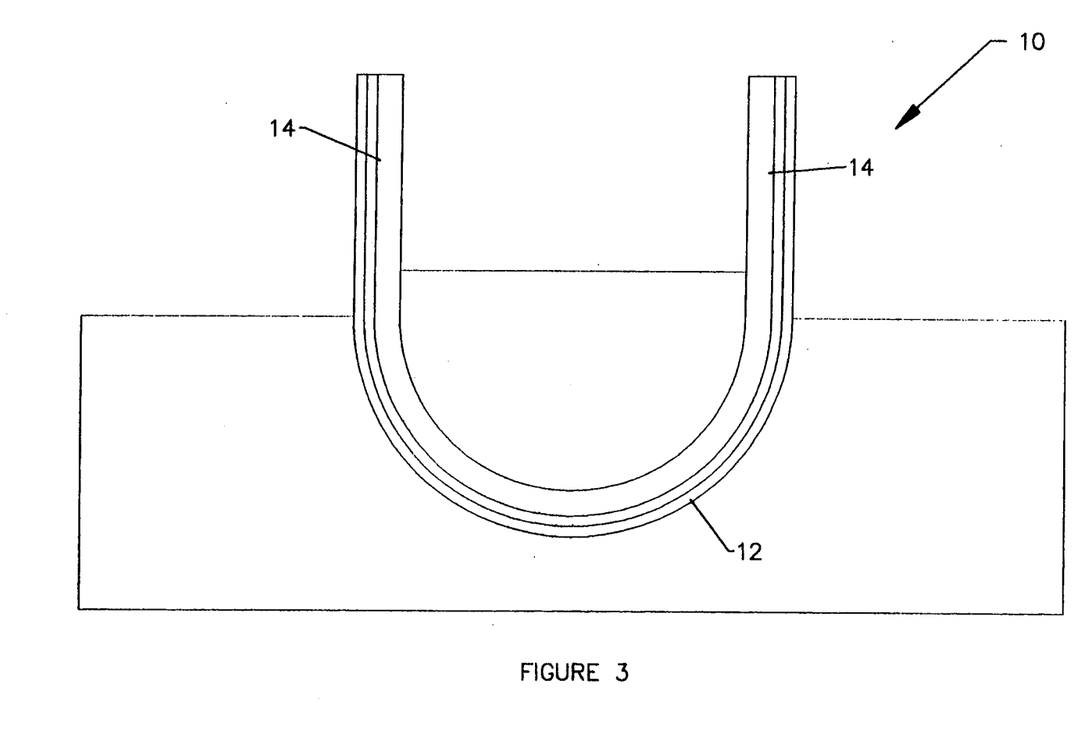
FIG. 3 is a diagrammatic sectional representation of the first step of cold bending the length of metal.

Referring first to FIGS. 1 to 5, the length of metal of FIGS. 1 and 2 is first bent in a cold press as indicated in FIG. 3 to form U-shaped item 10 which has a semi-circular portion 12 and adjacent arms 14.

Figure 4:
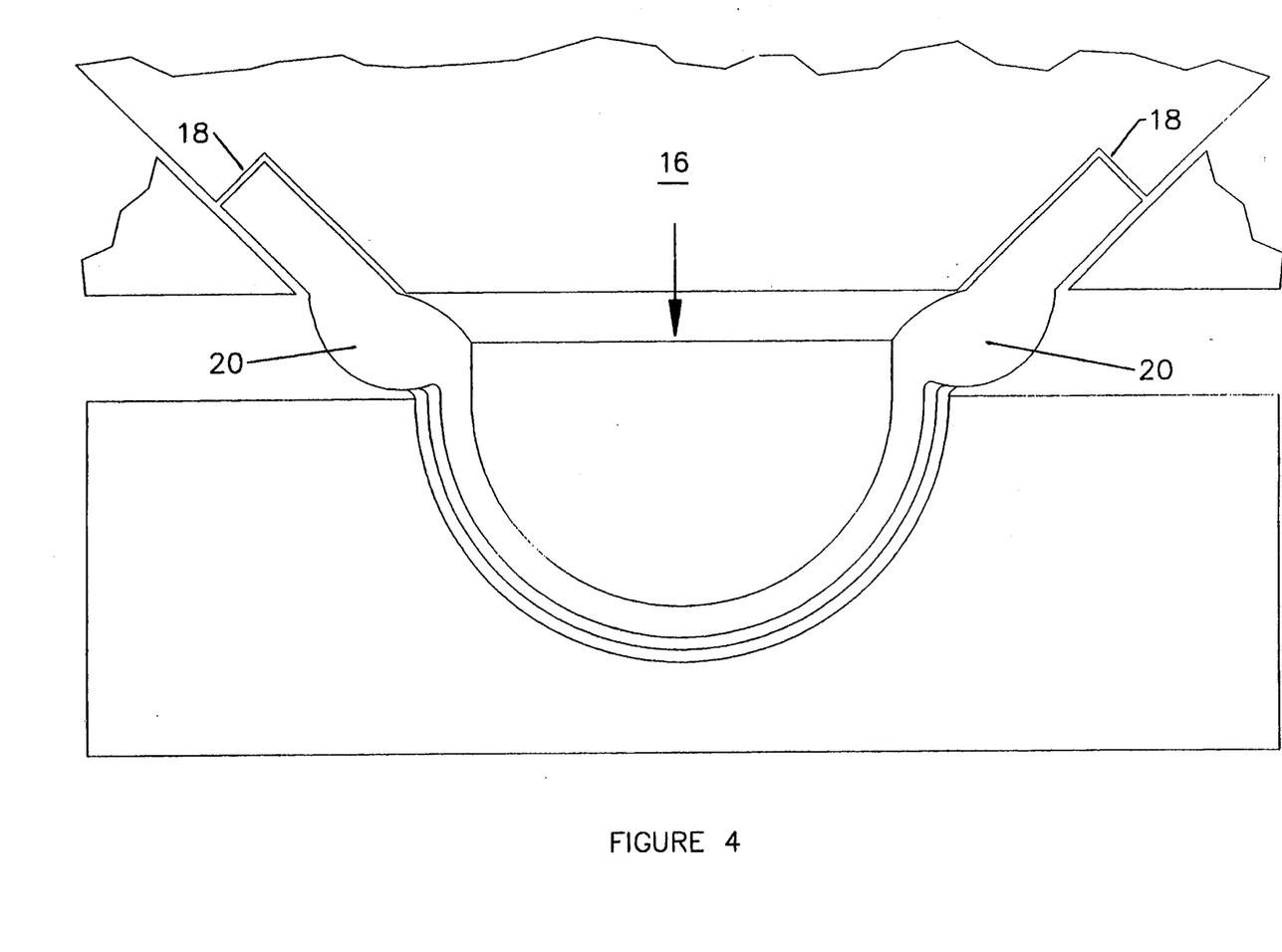
FIG. 4 is a diagrammatic sectional representation of the spreading and upsetting operations.

In the second operation, as illustrated in FIG. 4, a die 16 causes a spreading force to act on the arms 14, the die having shoulders 18 which act longitudinally on the arms. The item is heated and the force imposed by the shoulder 18 causes an upsetting at the zone 20.

As shown the die 16 has a 45° angle, so that the longitudinal force applied by means of the shoulder 18 acts when the arms are at 45°.

Figure 5:
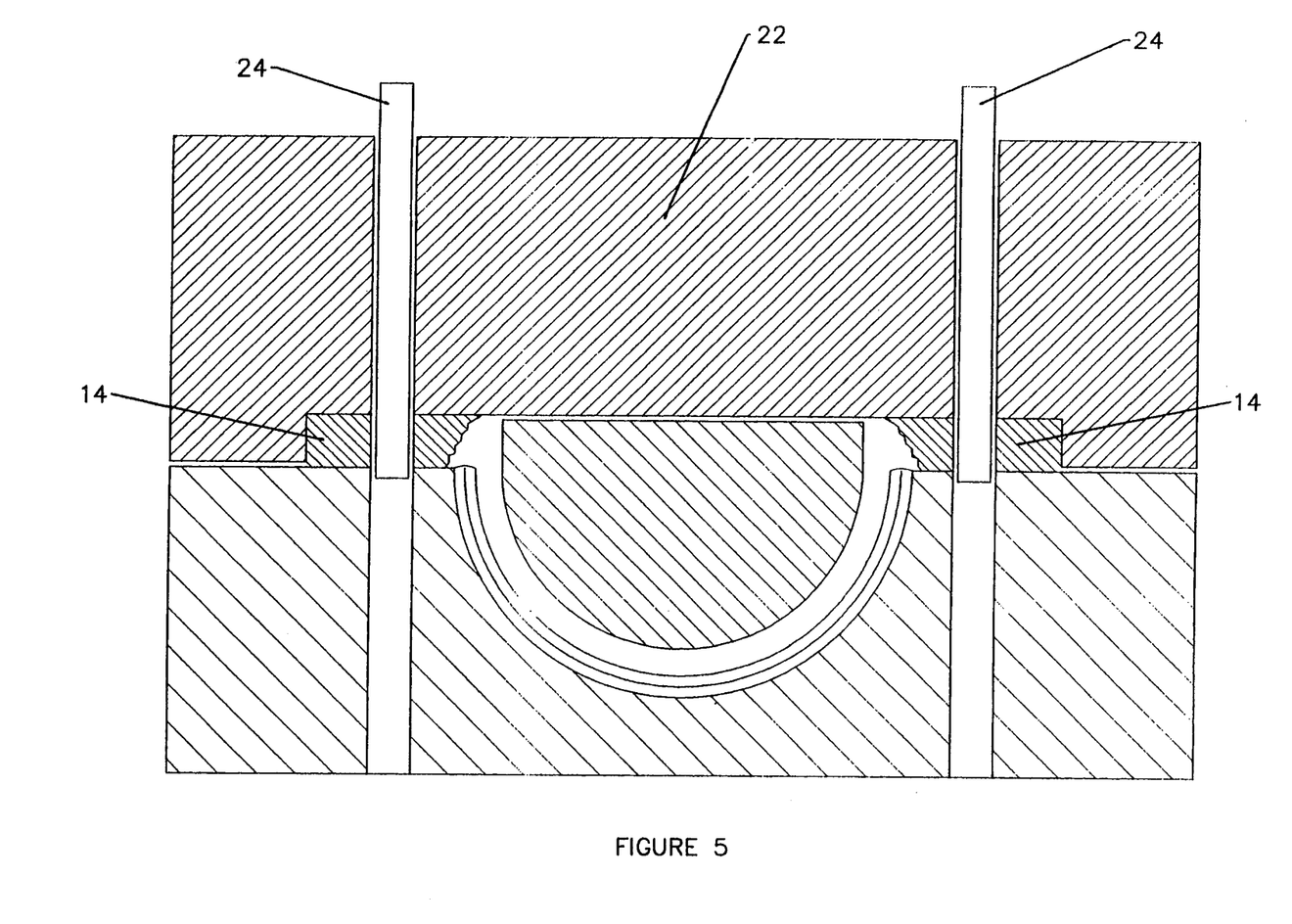
FIG. 5 is a diagrammatic sectional representation of the final operation.

The final operation is achieved by means of a square die 22 as shown in FIG. 5, this die causing the ears 14 to lie in the same horizontal plane as the diameter of the semi-circular portion. The die may also include orifice-forming elements 24.

Any excess metal is squeezed out of either end of the die and there may be a necessity to clean up the outer ends.

Figure 6:
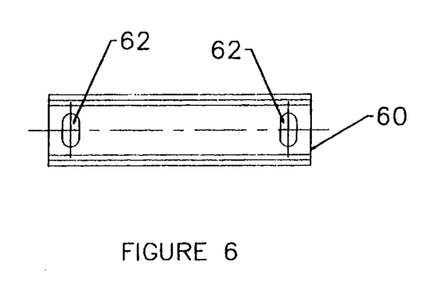
FIGS. 6 to 10 illustrate an alternative method of the invention.

In FIG. 6 a predetermined length 60 of a desired profile is cut and holes 62 are pierced at either end.

Figure 7:
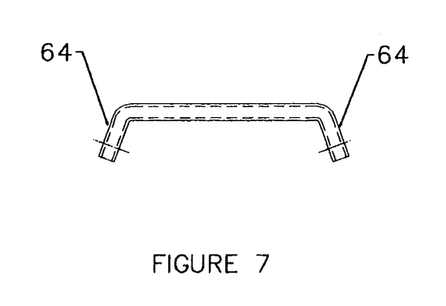

FIG. 7 is a side view of this length after being subjected to a cold bending process which results in the formation of ears 64.

Figure 8:
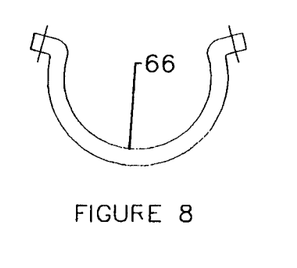

The next step is illustrated by FIG. 8 which is a side view of a semi-circular item 66 formed by a hot bending process as described above.

Figure 9:
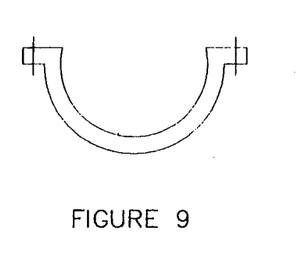

The coupling is completed by coining and trimming the ears, resulting in the final item shown in FIG. 9. The coining and trimming process results in an ideal sealing surface.

Figure 10:
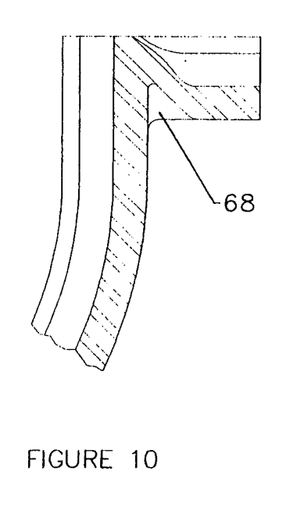

The coining process results in the formation of excess material and in FIG. 10, which is an enlarged view of the zone between the semi-circular portion and an ear, this excess material is forced to form a gusset 68 which adds significantly to the strength of the coupling.

Figure 11:
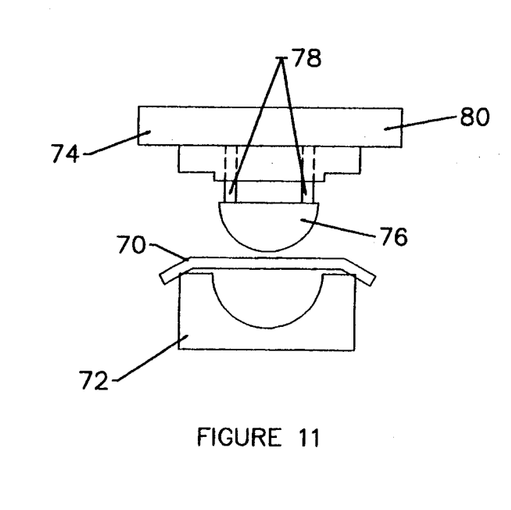
FIGS. 11 to 13 are diagrammatic representations of a tool set useful in the method of the invention.
Figure 12:
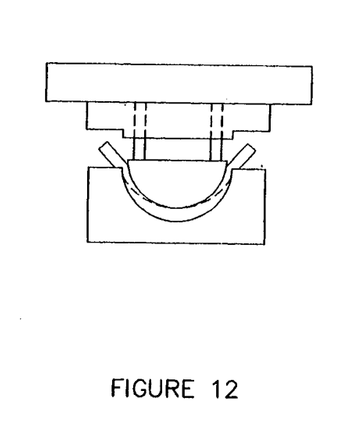
Figure 13:
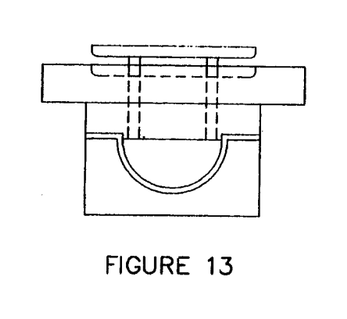

Referring to FIGS. 11 through 13, a profiled length 70 is heated to a temperature in excess of its Curie temperature level (about 90° C.) and placed on the die 72.

The press 74 has a double action movement. The punch 76 is mounted through bolts 78 to a pressure plate 80, the bolts 78 being spring-loaded to a predetermined tonnage.

The downward stroke distance of the die set is limited according to the load applied by the press, the first downward movement ensuring the formation of the semi-circular portion whilst maintaining an angle of about 55° to 65° for the bent-over ends. During this stage the punch 76 is not fully depressed so that there is a gap between it and the pressure plate 80 (see FIG. 12).

This gap is necessary so that metal can flow within the whole profile during the first bending stage, especially in the critical zone between the bent-over end and the semi-circular portion.

In the second stage, the load is increased until the die set is completely closed. In this stage the downward stroke of the punch 76 is not repeated but merely extended by :the upward movement of the pressure plate (see FIG. 13 ).

During the second stage the profile is coined to meet the dimensional requirements of the specific coupling size—for example the cavity height which ensures the snug fit of a rubber gasket;
the key height to the exact height (grooved couplings have a shorter key than shouldered couplings;it being appreciated that the final key height can be determined by suitable adaptions in the first stage);
the bent-over (ears) are flat to ensure a perfectly round coupling;
reinforcing gussets are formed bridging the ears to the semi-circular portion.

Both stages are completed before the profile cools to a temperature at which structural change takes place. The dies are made about 0.8 percent larger than the optimal size to allow for shrinkage on cooling.

As the die set is opened, the cushion of the press, which has been forced down by the die set, returns to its original position.

Figure 14:
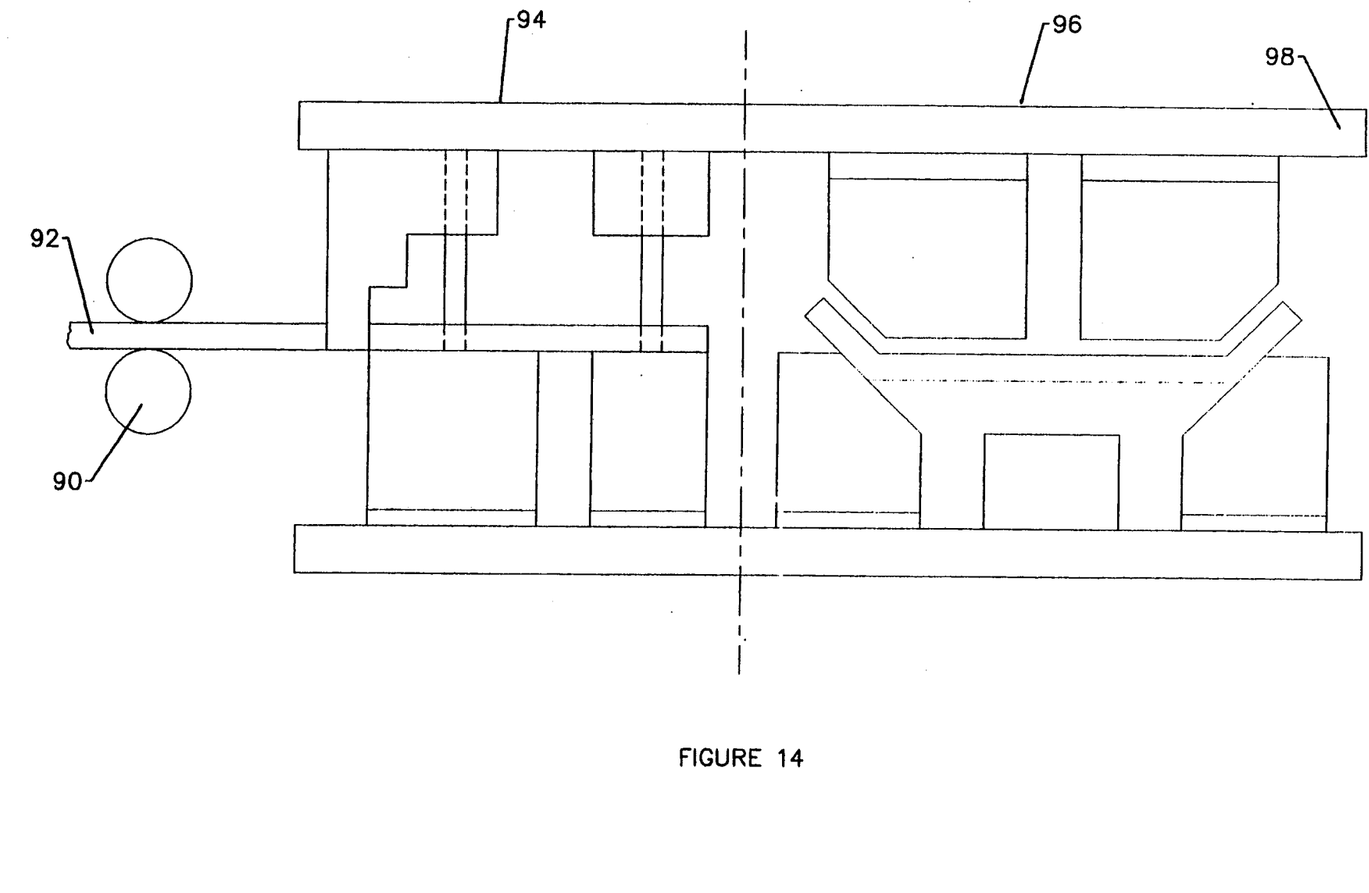
FIG. 14 is a diagrammatic representation of a feeder device for the tool set of FIGS. 11 to 13.

Referring now to FIG. 14 a feeder device 90 is provided for the profiled metal 92. In a first stage operation 94 a predetermined length of the metal profile is cut and also pierced at either end to form the orifices for the ears. From this first stage the lengths of profiled metal are moved to the second stage 96 as in FIGS. 11 through 13.

As each stage involves two operations it will be appreciated that they can be arranged for a complete part to be ejected from the second stage at every stroke of the common press 98.

Figure 15:
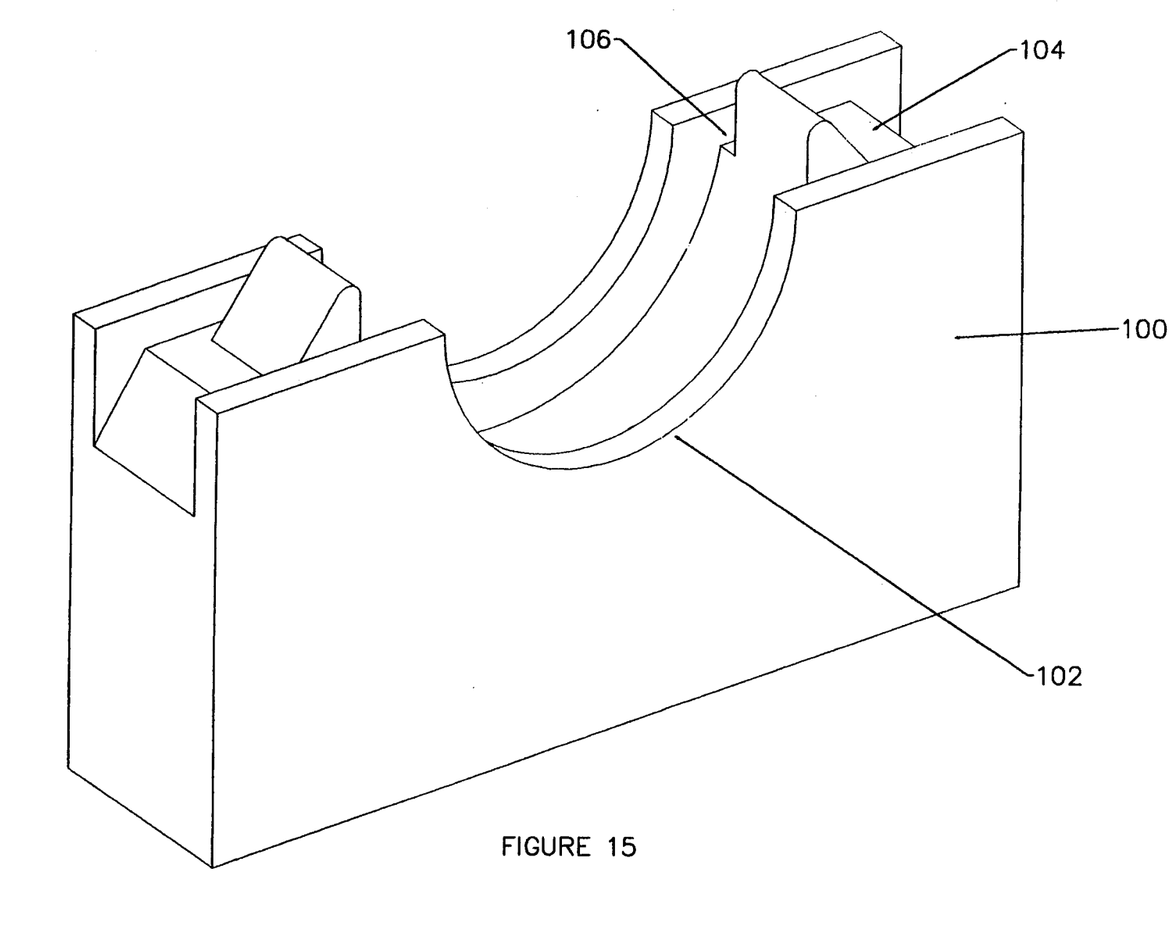
FIG. 15 is an isometric view of a mould for forming the gussets.
Figure 16:
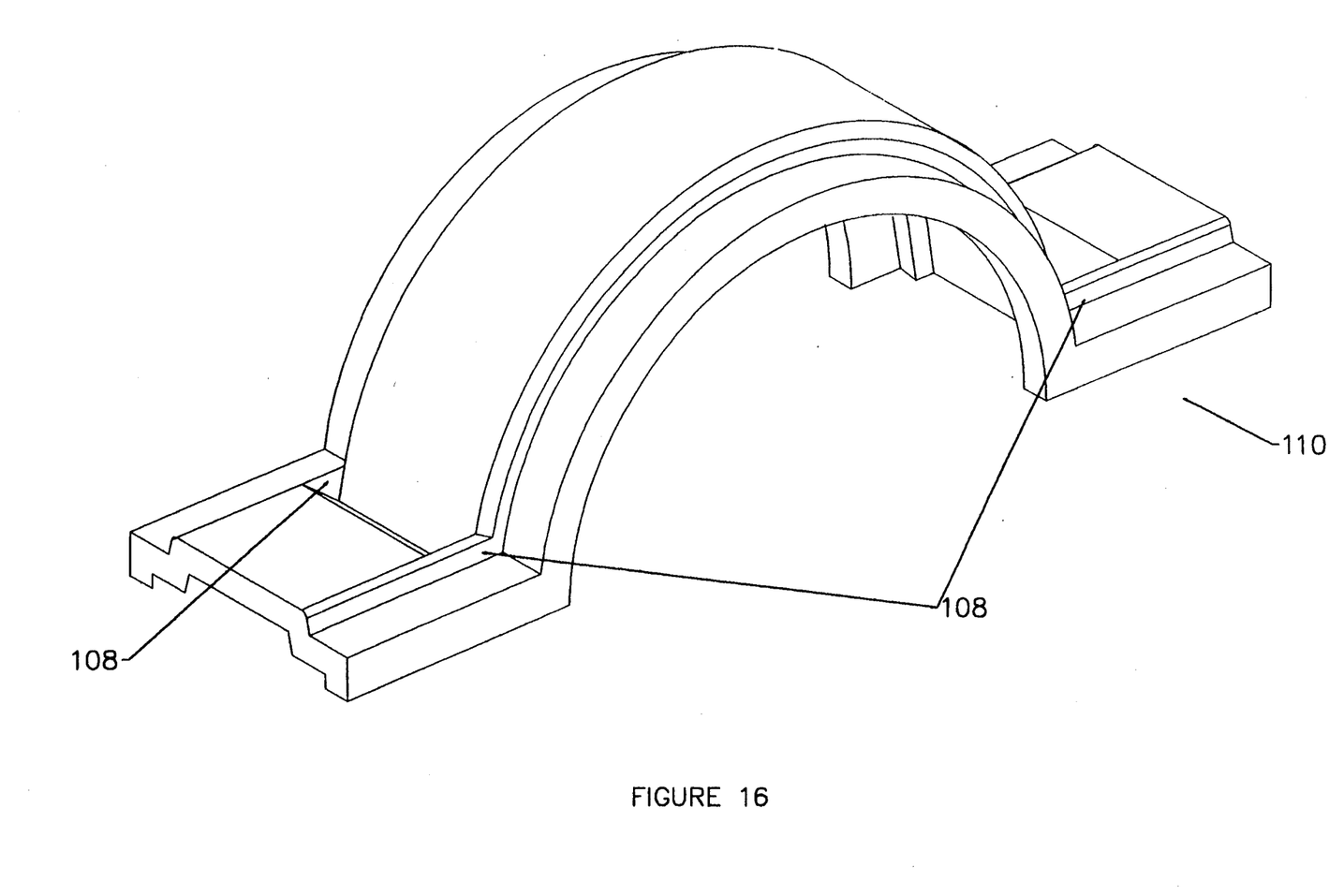
FIG. 16 is an isometric view of a gusset produced by the mould in FIG. 15.

In FIG. 15 a mould portion for creating gussets is illustrated and the resulting gussets are shown in FIG. 16.

The mould portion 100 includes a semi-circular portion 102, flat portions 104 and pockets 106 into which excess material will flow during the coining operation.

The pockets 106 produce gussets 108 in the item 110.

I claim:

1. A method of producing a coupling for pipes, which includes steps of:

subjecting a predetermined length of desired cross-sectional profiled material to a bending process in a mould having a semi-circular portion to form an item of semi-circular shape;
forming bent ends of predetermined size on the profiled material; and
then coining the bent ends to lie in an identical horizontal plane as a horizontal diameter of the item of semi-circular shape, said coining step being accompanied by a substep of forcing excess material from the predetermined length of profiled material into a zone between the semi-circular portion of the mould and the bent ends of predetermined size on the profiled material.

2. The method of claim 1 in which the predetermined length of profiled material is first subjected to a cold bending process to form the bent ends of predetermined size on the profiled material.

3. The method of claim 2 in which the item of semi-circular shape is subjected to a hot bending process to form the semi-circular shape; and the bent ends of predetermined size are then coined to lie in the identical horizontal plane as the horizontal diameter of the item of semi-circular shape, said coining step being accompanied by a substep of forcing excess material from the predetermined length of profiled material in to the zone between the semi-circular portion of the mould and the bent ends of predetermined size on the profiled material.

4. The method of claim 3 in which the zone between the semi-circular portion of the mould and the bent ends of predetermined size on the profiled material is formed into a gusset.

5. The method of claim 1 in which the includes substeps of:

first subjecting the predetermined length of profiled material to a cold bending process to form a U-shaped item having arms and a semi-circular portion,
bending the arms of the U-shaped item above the semi-circular portion of said U-shaped item,
applying a spreading force to such arms,
applying a predetermined force longitudinally to the arms to upset the zone, and
then completing application of the spreading force for the arms to lie in the identical horizontal plane as the horizontal diameter of the item of semi-circular shape.

6. The method of claim 5 in which the arms are heated prior to the substep of completing the application of the spreading force.

7. The method of claim 6 in which the substep of completing the application of the spreading force is accompanied by a substep of forming orifices through the arms.

* * * * *